United States Patent [19]

Cormier et al.

[11] Patent Number: 4,497,022
[45] Date of Patent: Jan. 29, 1985

[54] METHOD AND APPARATUS FOR MEASUREMENTS OF CHANNEL OPERATION

[75] Inventors: Roger L. Cormier, Pleasant Valley; Robert J. Dugan, Hyde Park; Richard R. Guyette, Hopewell Junction; Ronald L. Hankison, Poughkeepsie; Ming C. Hao, Chappaqua; Arthur L. Levin, Pleasant Valley, all of N.Y.; George A. McClain, Delray Beach, Fla.; Paul J. Wanish; Carl Zeitler, Jr., both of Poughkeepsie, N.Y.

[73] Assignee: International Business Machines Corp., Armonk, N.Y.

[21] Appl. No.: 435,192

[22] Filed: Oct. 19, 1982

[51] Int. Cl.³ .............................................. G06F 3/00
[52] U.S. Cl. .................................................. 364/200
[58] Field of Search ......................... 364/200 MS File

[56] References Cited

U.S. PATENT DOCUMENTS 3,748,650  7/1973  Garcia et al. ..................... 364/200
3,771,144  11/1973  Belady et al. ..................... 364/200
4,367,525  1/1983  Brown et al. ..................... 364/200

Primary Examiner—Raulfe B. Zache
Attorney, Agent, or Firm—W. S. Robertson

[57] ABSTRACT

A channel for a data processing system is provided with a time of day clock that is synchronized with the time of day clock of the associated central processor. Both the central processor and the channel processor record times of particular events, and the channel uses these times to calculate two times called Function Pending and Function Active. Both times begin when the central processor executes an instruction to begin an I/O operation. Function Pending ends when the channel has made successful initial selection. This time shows delays by the channel processor in scheduling the channel control unit, and device resources for I/O operations. Function Active ends at Channel End. A new instruction, Set Channel Monitor, enables or disables these measurements. An information block for each subchannel defines one of several measurement modes for a subchannel or disables the subchannel from measurement.

11 Claims, 7 Drawing Figures

METHOD AND APPARATUS FOR MEASUREMENTS OF CHANNEL OPERATION

FIELD OF THE INVENTION

This invention relates to a method and apparatus for measuring the time that is taken by components of a data processing system for channel operations.

INTRODUCTION

A central processor includes a main store and a computing engine or engines that execute system programs and user programs that are located in main store. A channel includes a channel store and a channel processor that handles I/O (input/output) operations of peripheral devices. The channel processor executes a channel program that is located in main store and is made up of commands. To begin an I/O operation in response to a request by a user program or a system program, the system control program executes I/O instructions. For example, an I/O instruction and the associated protocol to start an I/O operation identifies a particular I/O device, a location in main store when the channel program is located, and a Location in main store where the channel is to save or fetch data. In the data processing system that will be described later, the channel processor also performs operations relating to scheduling the I/O devices to handle particular tasks as the devices and associated data paths become available.

A general object of the invention is to provide a new and improved method and apparatus for measuring the time required for channel operations.

THE PRIOR ART

There are many useful applications for monitoring or measuring operations in a data processing system. As a familiar example, the time that a user of a system is connected to the central processor or other resources of the system commonly appears at the end of a print out. This information is useful in billing the user. It is also known to measure operations of many different system components so that operating personnel can tell whether these components are being used effectively or in order to measure the operation of a program that these components execute. This information can be used to plan for expanding the system as components become overloaded or to reconfigure the system to better balance the use of the components. Measurement data can also be used dynamically to schedule tasks to be performed on particular components that happen to be less heavily used and to avoid data paths that are more heavily used.

A number of techniques have been suggested for making these measurements and some of these techniques are adapted to the method and apparatus of this invention. As a starting example that is not specifically relevant to this invention, it is conventional in a development laboratory and also in systems that have been installed at a users location to attach temporary probes to signal points or similarly to make permanent connections to lines that carry signals for operations that are to be monitored. Pulses on these lines can be counted or they can be used to start and stop timers.

As a more relevant example, processor and channel functions have been measured by program that run on the central processor. The processor has a time of day clock and the measurement program accesses the time of day clock and keeps track of the starting times and the accumulated times for selected operations that can be signaled to the monitoring program. See "OS/VS2 MVS Resource Management Facility (RMF) General Information Manual GC28-0921-2", available from International Business Machines Corporation.

Several other references relate to the general technique of monitoring an operation by means of special instructions that are located in the program that performs the operation. These instructions start a timer at a particular point in a program that is to be timed and stop the timer at a later point. Similarly, a counter can be incremented by instructions that are made part of a routine for an operation that is to be counted. See IBM Technical Disclosure Bulletin, April 1968, pages 1700–1703, Freeman, U.S. Pat. No. 3,763,474, Taylor, U.S. Pat. No. 3,399,298, Denny, U.S. Pat. No. 4,034,353.

SUMMARY OF THE INVENTION

The method and apparatus of this invention are particularly adapted to perform measurements on a channel operation that is started by a machine language instruction called Start Subchannel. In this operation, the instruction and the associated protocol identify to the channel a subchannel and an associated I/O device and the main storage location of the channel program. This information is passed to the channel, and the channel then schedules the I/O operation in the same general way that the operation would otherwise be scheduled and dispatched by a control program in the central processor, and initial selection then takes place. One of the objects of this invention is to measure the delays between the execution of Start Subchannel in the central processor and Initial Selection which later takes place independently in the channel. For this measuring operation, the invention includes a time of day clock that is synchronized with the time of day clock of the central processor. Means is provided in the microcode of the Start Subchannel instruction to read the time of day clock of the central processor and to store this value in a suitable location that is accessible to the channel. Means is provided in the channel program that performs initial selection to read the time of day clock of the channel and to fetch the value of the time of day clock that was stored by the central processor and to calculate the time difference and to store this difference in a suitable location. This time is called Function Pending Time.

After Initial Selection the device typically disconnects from the channel and later reconnects and continues, typically with further disconnects, until the channel interrupts the central processor to signal that the operation has been completed. This point in the channel operation is called Channel End (because the device sets a status bit that is called Channel End). The accumulation of times during which the device is connected is called device connect time. In the system of this invention the channel provides the device connect time in one form that is suitable for use such as billing the individual user of the subchannel and it accumulates this time in a second form that is suitable for use in manually or automatically planning or scheduling channel resources.

The invention also provides means in the channel program for measuring the time between Start Subchannel and Channel End which is called Function Active Time. These measurements are useful directly and they can be used in combination to calculate other useful functions.

The channel has means in the routine for handling ending status to store Function Pending Time, Function Active Time and Device Connect Time in a Subchannel Measurement Block location in main store that is preassigned to the particular subchannel. (Device Connect Time is also stored separately in an Extended Status Word that is made available with other interruption status information at the conclusion of an I/O operation.)

The invention also provides means including a new machine language instruction called Set Channel Monitor (SCHM) for enabling the monitor function. This instruction provides the starting address of the subchannel measurement blocks which the channel uses for storing the monitored time values and it establishes which parameters are to be measured or that no measurement is to be made. The channel has means for storing this address and the related information.

Means is also provided for selectively enabling or disabling the measurement function for each subchannel (when the measurement function is turned on by the Set Channel Monitor instruction). A data block for each subchannel that is called the Subchannel Information Block contains a two bit field that identifies one of three modes of monitoring operations. (One of the four possible codes is not used.) In one mode, the monitor function is disabled for the subchannel. In another mode only conventional device connect time is measured and is stored in the Subchannel Status Word. In another mode all of the subchannel measurements that have been described are collected and stored.

The Subchannel Information Block is also arranged to store an address offset or displacement to the starting address in the instruction Set Channel Monitor and the channel program has means for adding the offset to the starting address for accessing the Subchannel Measurement Block.

Other objects and features of the invention will be apparent from the description of the preferred embodiment.

THE DRAWING

FIGS. 3A-D show components of the channel and the interconnecting signals in a representative measurement operation.

Figure 4:
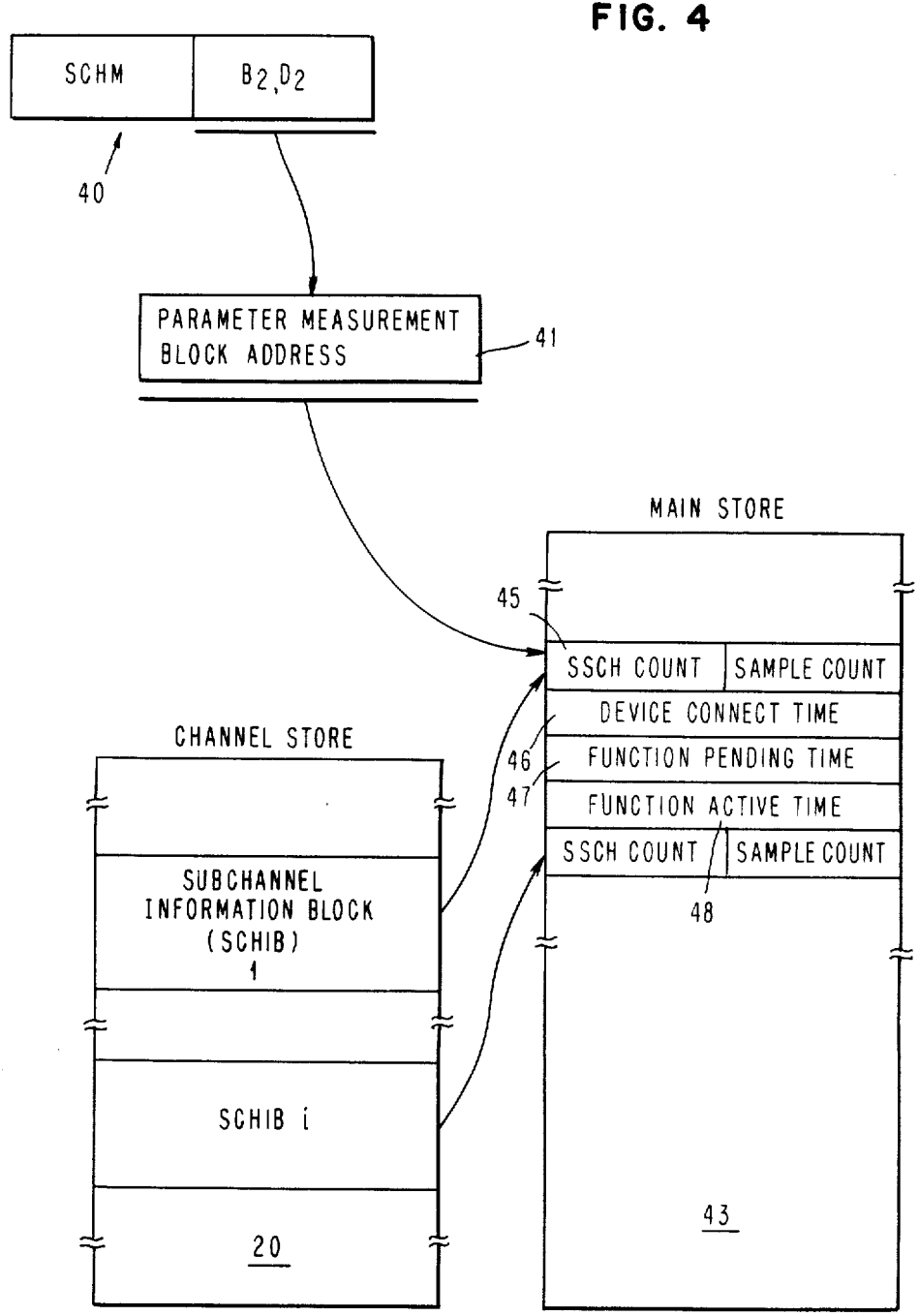

FIG. 4 is a diagram showing the format in storage of the channel measurement parameters and the associated system of addresses to these storage location.

THE PREFERRED EMBODIMENT

Figure 1:
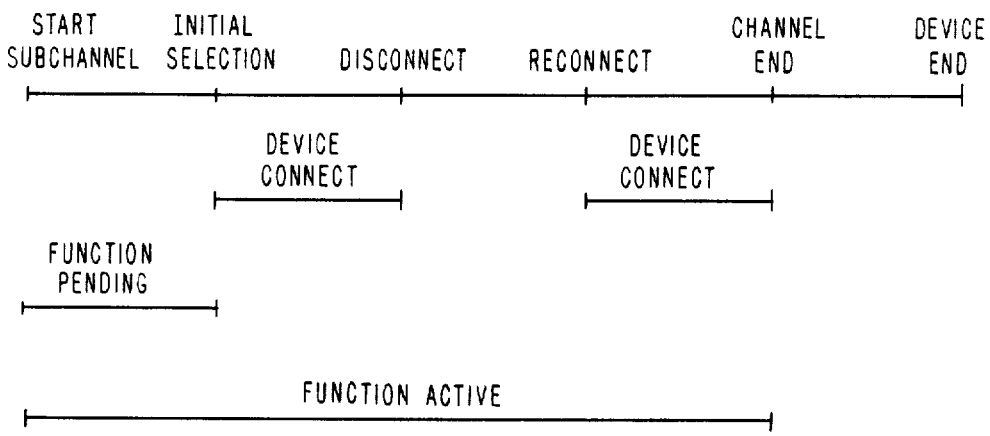
FIG. 1 is a timing diagram of an I/O operation showing points at which times are recorded and the time intervals that are measured.

The Operations to be Measured—FIG. 1

The invention is preferably adapted to be used with a system in which a central processor (which may have several engines) operates with a single channel (which also may have several engines) and in which each device has a separate subchannel (as is conventional). In this system, the processor starts an I/O operation by means of an instruction that is called Start Subchannel. In the execution of this instruction, the channel is given the identification of the device and the address of the channel program in main store (both steps are conventional). The central processor is then free to branch to some independent operation. FIG. 1 shows Start Subchannel as one of the measurement points in the system of this invention.

The information in the instruction Start Subchannel is put onto a queue in channel storage (sometimes called bump storage) and the channel schedules the resources that are required to establish the data path of the subchannel in the same general way that other tasks are scheduled by a processor. At a point in this operation the channel contacts the device controller in a conventional process that is called initial selection. FIG. 1 shows this point called successful initial selection. The time from Start Subchannel to Successful initial selection is called Function Pending Time.

Function Pending Time is useful because it may be long for some devices that are heavily used and shorter for other devices that are less heavily used. For example, a number of disks or other similar devices may provide a pool of storage space that the system control program allocates temporarily to programs of users. This measurement is useful in allocating storage space from devices that currently have shorter times for function pending.

When successful initial selection has been made, the channel executes the first command. In the example of the operation of a magnetic disk, this command tells the disk controller to position the disk head at a particular track for a read or write operation. This mechanical operation is relatively slow, and the device controller is ordinarily programmed to disconnect from the channel for this operation. This point in FIG. 1 is indicated by the legend Disconnect. When the device is ready to execute a command of the channel program, it reconnects. Typically a device disconnects and reconnects several times after Start Subchannel and FIG. 1 shows two representative Device Connect times. Device Connect time is commonly measured for each user. As will be explained later, the system of the drawing provides this function on a user basis and also provides accumulated connect time for an individual device.

FIG. 1 also shows Channel End and Device End which are conventional points in an I/O operation. The time from Start Subchannel to Channel End is measured by the apparatus of this invention and is called Function Active time. Function Pending, Function Active and Device Connect times are each useful individually, and in addition they can be combined to calculate other times.

Figure 2:
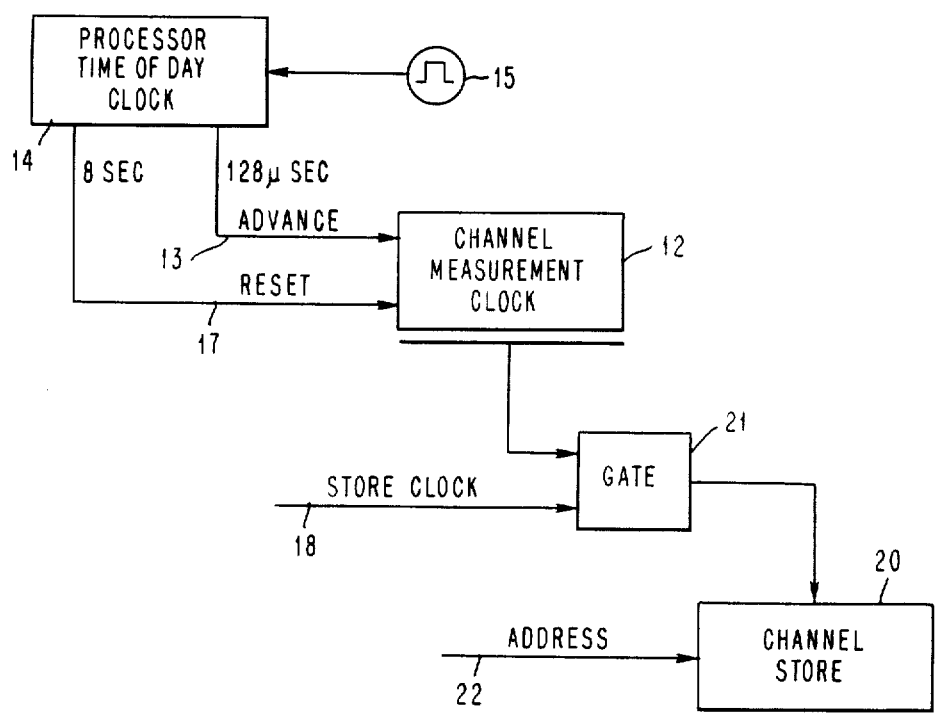
FIG. 2 shows the circuit of a clock that is used by the channel in recording times.

The Channel Clock—FIG. 2

The channel is provided with a clock 12 that is used in the measurement operations of this invention. The clock conventionally comprises a number of counter stages that are connected to be incremented by a stepping or advance pulse that appears periodically on a line 13 at intervals that correspond to the resolution that is desired in the channel measurements.

The channel clock is synchronized with the time of day clock 14 of the associated processor. The system time of day clock can be read by an instruction called Store Clock (STCK) which includes an address of a sixty-four bit location in main store where the current value of the time of day clock is to be stored. See "IBM System/370 Principles of Operation: GA22-7000, pages 141, 142. This clock also has a number of counter stages and an oscillator 15 that steps the counter in increments that represent units of time. One stage of the counter is selected as appropriate to the degree of resolution that is desired in the channel measurements, and in the preferred system this interval is one hundred twenty-eight microseconds. Line 13 connects the one hundred twenty-eight microsecond output of the system time of day clock to the advance input of the channel clock.

Another time signal of the system time of day clock is connected by a line 17 to form a reset for the channel clock. This time unit is about eight seconds in the preferred system. This reset from the system time of day clock keeps the channel clock identical to the corresponding stages of the system time of day clock (after an initial reset operation) so that an operation can be timed partly from the system time of day clock and partly from the channel clock. This reset connection also synchronizes the clocks of different channels that are part of a multi-processor system because the time of day clocks of the different processor systems are independently synchronized. (There is one channel for each processor system and a processor system has one or more processors (not shown) that operate under a common control program.)

Eight seconds is conveniently represented by a sixteen bit value and it is long enough to include virtually any possible I/O operation that is to be measured.

The channel clock is arranged to be read by an instruction or a micro-instruction of the channel processor and the clock value is stored in the channel store at a location that is specified in the instruction. This structure is similar to the structure of the system time of day clock and is illustrated in FIG. 2 by a signal Store Clock on a line 18, the channel store 20 and a system of gates 21 that transfers the channel clock value to a channel store location designated by an address on a line 22 from the instruction decoder.

The Device Connect Measurement—FIGS. 3A to 3D

This series of figures shows the components of the channel that measure Device Connect time, which is a convenient example of all of the measurement operations. The operations of the channel store 20, the control store 25 and the arithmetic and logic unit (ALU) 26 will be familiar from standard operations of these components.

Figure 3A:
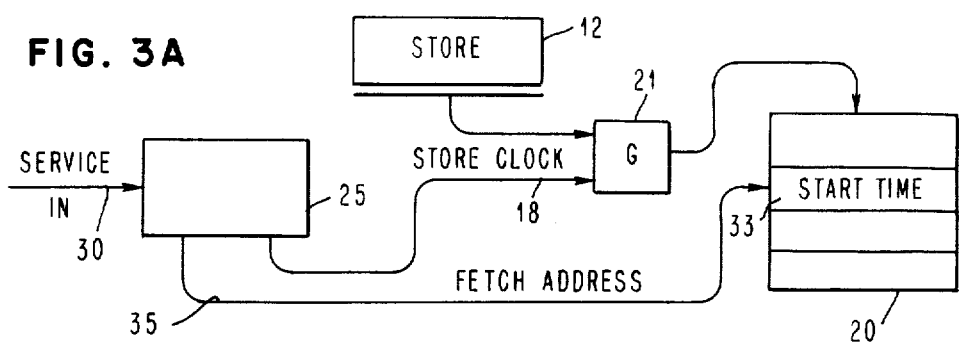

In FIG. 3A, initial selection has been made and is signaled by a device on a tag line 30 called Status In. (The details of successful initial selection are set out in publication GA22-6974, available from International Business Machines Corporation.) This signal causes the channel to execute a microprogram that is located in control store 25. This otherwise conventional microprogram includes instruction means for reading the channel clock 12 and loading its current value into a predetermined location 33, arbitrarily called Start Time, in channel store 20. The address of this storage location and a field calling for a store operation are carried in the microcode instructions as is conventional and as line 35 in the drawing represents. The microcode also supplies the signal Store Clock on line 18.

Thus, at an appropriate point in the usual routine associated with device reconnect, the channel time is stored. Since the speed of the channel processor is very fast in relation to the resolution of the channel clock, it will ordinarily make little difference where this measurement operation is located in the routine for handling Status In.

The fall of Operational In conventionally signals device disconnect and causes the channel to begin a routine to respond to this condition. In the method and apparatus of FIGS. 3B, C and D, this conventional routine contains microinstruction means for reading the channel clock, subtracting the value from the value stored in FIG. 3A, and storing the difference in a predetermined location of channel store that is called Accumulate. The drawing is representative of various ways in which this operation can be performed.

Figure 3B:
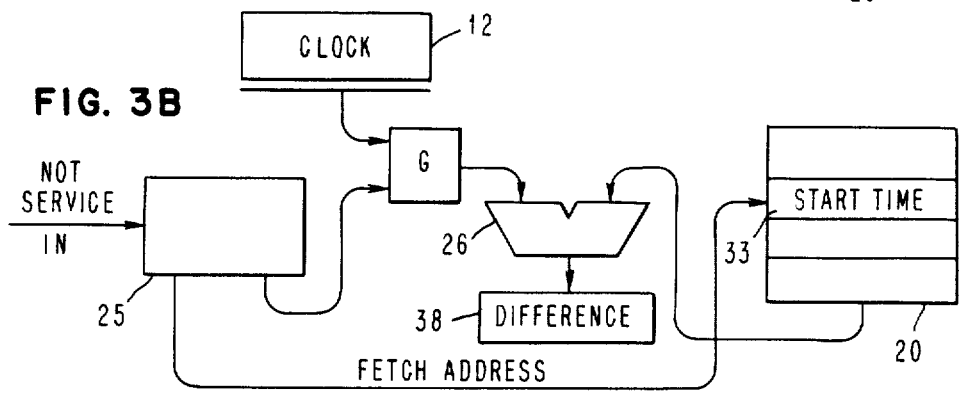

In the step illustrated by FIG. 3B, a microinstruction or a series of microinstructions read the channel clock and apply the clock value at one input of ALU 26 and also fetch from channel store 20 the clock value stored in the in the operation of FIG. 3A and apply this value to the other input of ALU 26 and also control ALU 26 to perform a subtraction and to load the difference into a register 38 or an equivalant location in channel store 20.

Figure 3C:
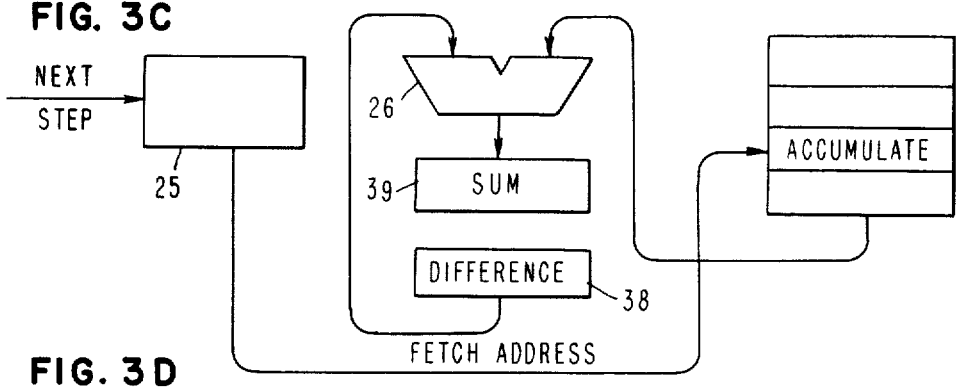
Figure 3D:
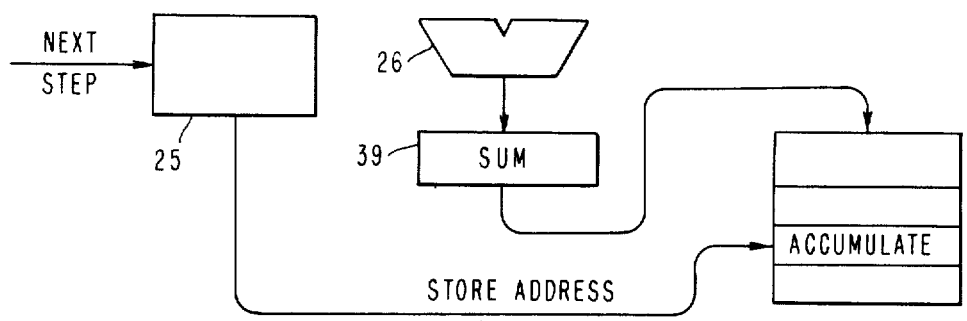

FIG. 3C is a continuation of this operation, as the signal Next Step to the control store signifies. In this operation the channel store is accessed at the location Accumulate which holds the accumulated time for any previous connect/disconnect sequence. This value and the difference in register 38 are summed and stored in a location 39. As the operation of the channel continues in FIG. 3D, the sum in register 39 is stored in the accumulator location in channel store. As the device continues to reconnect and disconnect, the operations of FIG. 3A through 3D are repeated and the device connect time accumulates in the Accumulate location.

Notice that the channel clock may be reset between the step of FIG. 3A and the step of FIG. 3B so that the difference in register 38 is a negative value. In this situation, the reset value of the channel clock (eight seconds in the specific example) is added to the negative value. The conventional techniques for testing for a negative value and either adding or not adding the eight seconds will be readily understood without a specific example.

The Other Channel Measurement Operations

From the detailed example of the operation for device reconnect and device disconnect, the method and apparatus for the measurements at the other points in FIG. 1 can be understood from only a brief description. Start Subchannel time is recorded from the system clock by the execution of microcode for the instruction Start Subchannel. The time of day clock can be stored in any convenient location that is accessible to the central processor and to the channel, such as a location in the main store that is otherwise assigned to the operating system or to a location in channel store. In the preferred system, the time of day clock value is stored in the Channel Store. Successful initial selection is signaled by the rise of Status In, and the related channel routine includes means for reading the channel clock and subtracting from it the time of Start Subchannel in the way that has been described for any device connect time in relation to FIGS. 3B, C and D.

Channel End is signaled to the channel by the device and in response to this signal the channel reads the channel clock and calculates Function Active time in the way that has been described for Function Pending time. The channel also updates the device connect time as already described.

Storage Organization—FIG. 4

Subchannel measurement operations take place when the central processor executes an I/O instruction called Set Channel Monitor (SCHM). Block 40 in FIG. 4 shows the familiar format of a sixteen bit field for the operation code and a sixteen bit field for an address in the form of a base and a displacement. In the preferred system, the address is stored in general register 2. When the instruction is executed by the central processor, the channel stores the address as represented by block 41. This address points to a location in the central processor main store 43 where the measurement data is to be stored for each subchannel that is to be measured. Alternatively, in a preferred embodiment the address is located in a predetermined general purpose register of the central processor.

FIG. 4 shows the format for storing the measurement parameters. Each subchannel has four word locations (of thirty-two bits each) 45, 46, 47 and 48 for the measurement parameters. Each channel also has an extended measurement area of four additional words (not shown) for additional measurement parameters that may be desirable. When the measurement parameters have been loaded into main storage, they are accessible to a program such as RMF that would print them in a format that is useful in the operation and organization of the data processing system. The parameters can also be used by a program that allocates system resources as has already been described.

In channel store 20 the channel maintains a block for each subchannel that is called the Subchannel Information Block (SCHIB). This block includes an address offset that is combined with the address in register 41 to point to the measurement block for the particular subchannel. Addressing of this kind is widely used and does not require detailed explanation. The SCHIB's can be assigned to any convenient location in channel store 20.

The channel also maintains a Subchannel Status word (not shown) for each subchannel which contains for example the CCW Address and is generally similar to a Channel Status Word.

When the address field of the instruction Set Channel Monitor is set to all zeros, the measurement operation is inhibited. Alternatively, in a preferred embodiment, one bit in general register 1 is a one to enable monitor mode and is a zero to disable monitor mode. Thus the instruction can be thought of as having one form to enable measurement and a second form to disable measurement. The microprogram routines that have been described in relation to FIG. 4 include instructions to test this status and to execute the measurement instructions or to branch around them according to the condition established by Set Channel Monitor. In the operating system, routines that include Set Channel Monitor and associated routines that set up the SCHIB's are enabled or disabled for a particular measurement in the same way that the operating system is selectively controlled to provide or not to provide available functions.

Means is also provided for disabling an individual subchannel for measurement or for enabling one or both or two measurement modes. This condition for a subchannel is controlled by a two bit field in its SCHIB and this field is tested by the techniques described for Set Channel Monitor. In one mode, the subchannel is enabled for the measurements that are shown in main store 43 in FIG. 4 and for reporting device connect time in the Extended Subchannel Status Word. In another mode, only the device connect time of the Subchannel Status Word is measured.

Storing the Measurement Parameters

As part of the normal operation of the channel at Channel End, the channel includes microprogram means to store Device Connect time, Function Pending time, and Function Active time, (according to the mode set in the SCHIB and whether the channel is enabled for measurement). In addition the channel fetches, increments and restores the Sample Count and the SSCH count shown in FIG. 4. SSCH count in incremented in either active measurement mode, whenever device connect time is tored. Sample Count is stored only when Function Active and Function Pending are also stored. Thus, SSCH count is updated in any event and the other values are updated selectively. The conditions of the microcode will be apparent without detailed explanation.

OTHER EMBODIMENTS

The hardware of the channel and the central processor correspond specifically to the IBM 3081 but the channel clock of this invention and its connection to the conventional processor clock is applicable to various processor and channel designs. This processor has a single channel, but the invention is applicable to systems that conceptually have more than one channel. Other aspects of the invention have been illustrated by the incorporation of new microcode routines in the otherwise normal microprograms of the channel. In some applications of the invention it may be desirable to start and/or stop the timings from tag lines that signal the occurence of the operation as is often done with monitors that separately attach to components of a data processing system. The actual microprograms can be implemented in various ways. Thus, those skilled in the art will recognize many applications for this invention and appropriate variations within the spirit of the invention and the scope of the claims.

We claim:
1. A channel measuring system comprising,
   a central processor having a time of day clock, a channel having a channel clock, means connecting a stage of the central processor time of day clock to increment the channel clock at intervals defining the resolution of the measuring system, and means connecting a stage of the central processor time of day clock to reset the channel clock at intervals corresponding to the longest channel operation to be monitored, whereby after an initial reset operation the channel clock is comparable with corresponding stages of the central processor time of day clock,
   means in the central processor for starting a channel operation including means for storing the value of the system time of day clock in a predetermined location,
   means in the channel for accessing the channel clock at a predetermined point in said channel operation, and
   means in the channel for subtracting the stored value of the central processor time of day clock and the channel clock and calculating the time interval from the time when the central processor starts the channel operation to the time when the channel reaches the predetermined points in its operation, whereby channel measurements operations are performed.

2. The system of claim 1 wherein said central processor includes means for executing an instruction selectively enabling or disabling said channel measurement operations.

3. The system of claim 2 wherein said channel includes means for storing said time in a location in main store and said instruction includes a pointer to the address of this location.

4. The system of claim 3 wherein said channel includes means responsive to a predetermined address in said instruction to disable said channel measurement operations.

5. The system of claim 4 wherein said channel includes an information block for each subchannel, said central processor includes means for loading an address offset into an information block, and said channel includes means for storing measurement parameters for a subchannel in the location in main store defined in said instruction and said subchannel information block.

6. The system of claim 5 wherein the central processor includes means for loading into the subchannel information block a field defining a particular mode of measurement or disabling measurement for the subchannel, and wherein said channel includes means responsive to said mode for measuring parameters on the basis of a particular user of the system and/or the basis of a particular subchannel.

7. The system of claim 6 wherein said means responsive to said mode includes means for storing parameters measured on the basis of a particular user as part of a subchannel status word.

8. The system of claim 1 wherein said channel means for accessing said channel clock at a predetermined point includes means for accessing said channel clock at successful initial selection and at channel end and wherein said channel means for calculating the time interval includes means for calculating the time from starting the subchannel operation to successful initial selection (Function Pending Time) and the time from starting the subchannel operation to channel end (Function Active Time).

9. The system of claim 8 wherein said channel means for accessing said channel clock at a predetermined point includes means for accessing the clock at device connect and device disconnect times and wherein said channel means for calculating the time interval includes means for calculating the interval between a device connect and the next device disconnect and for accumulating device connect time for a subchannel operation.

10. The system of claim 9 wherein said channel includes means for storing device connect time in a first location (parameter measurement block) and a second location (subchannel status word) and wherein said central processor includes means for accessing said first location and calculating the usage of the associated subchannel without regard to particulat user programs and for accessing the second location and calculating the use of I/O resources by a particular user program.

11. A method for measuring parameters of subchannel operations, comprising,
recording the time of execution of a central processor instruction to start a subchannel operation (Start Subchannel),
determining the time of acceptance of the first channel command by the device associated with the subchannel (Successful Initial Selection),
determining the time of the completion of the channel operation (Channel End),
operating on the times to produce a first time (Function Pending) that indicates the delays by the channel in obtaining resources for the subchannel operation and to calculate a second time (Function Active) that indicates the total time of the subchannel operation.

* * * * *